US012637227B2

(12) United States Patent
Siemann et al.

(10) Patent No.: US 12,637,227 B2
(45) Date of Patent: May 26, 2026

(54) FUSELAGE PORTION, AIRCRAFT, AND METHOD

(71) Applicant: Airbus Operations GmbH, Hamburg (DE)

(72) Inventors: Martin Siemann, Hamburg (DE); Florian Leichsner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/185,774

(22) Filed: Apr. 22, 2025

(65) Prior Publication Data

US 2025/0326494 A1     Oct. 23, 2025

(30) Foreign Application Priority Data

Apr. 23, 2024     (EP) ...................................... 24171946

(51) Int. Cl.
B64D 37/04          (2006.01)
B64C 1/06           (2006.01)

(52) U.S. Cl.
CPC .............. B64D 37/04 (2013.01); B64C 1/068 (2013.01)

(58) Field of Classification Search
CPC ...... B64G 1/4022; B64D 37/04; B64D 37/00; B64D 37/30; B64C 1/068
See application file for complete search history.

(56) References Cited

U.S. PATENT DOCUMENTS 3,243,150 A * 3/1966 Woodcock ............. B64D 37/06
                                                    244/135 R
3,951,362 A    4/1976 Robinson et al.

3,966,147 A * 6/1976 Wittko ................... B64D 37/04
                                                    248/311.2
5,012,948 A * 5/1991 Van Den Bergh .... F17C 13/087
                                                    505/892
12,325,529 B2 * 6/2025 Grip ....................... B64D 37/04
2010/0011782 A1    1/2010 Matthias
2010/0170997 A1 * 7/2010 Smith ................... B64D 11/00
                                                    244/172.3
2015/0360792 A1   12/2015 Faure et al.
(Continued)

FOREIGN PATENT DOCUMENTS

CN     115042953 A     9/2022
EP       4349716 A1     4/2024
KR     20090057284 A     6/2009

OTHER PUBLICATIONS

European Search Report for corresponding European Patent Application No. 24171946.7 dated Oct. 17, 2024.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A fuselage portion of or for an aircraft. The fuselage portion comprises an aircraft component which is installed in a shell of the fuselage portion by a plurality of connector elements. Therein, a respective first end of each connector element is held in an associated bore b running through the shell, and a respective second end of each connector element is joined to the aircraft component by a joint providing the respective connector element with a margin of swiveling relative to the aircraft component. Also an aircraft comprising such a fuselage portion, and a method for assembling such a fuselage portion.

15 Claims, 3 Drawing Sheets

(56)　　　　　　　References Cited

U.S. PATENT DOCUMENTS

| 2022/0289401 A1 | 9/2022 | Heck et al. | |
| 2024/0116650 A1 | 4/2024 | Metzner et al. | |
| 2024/0336368 A1 * | 10/2024 | Pettey | B64D 37/06 |
| 2024/0417098 A1 * | 12/2024 | Grip | B64D 37/06 |

* cited by examiner

FUSELAGE PORTION, AIRCRAFT, AND METHOD

CROSS-REFERENCES TO RELATED APPLICATIONS

This application claims the benefit of European Patent Application Number 24171946.7 filed on Apr. 23, 2024, the entire disclosure of which is incorporated herein by way of reference.

FIELD OF THE INVENTION

The present invention concerns a fuselage portion of or for an aircraft, wherein the fuselage portion comprises an aircraft component which is installed in a shell of the fuselage portion. The present invention further comprises an aircraft comprising such fuselage portion, and a method for assembling such fuselage portion.

BACKGROUND OF THE INVENTION

Aircraft typically comprise a fuselage with a shell, and one or more aircraft components which are installed in the shell. For instance, such aircraft components may be fuel tanks containing a fuel to be supplied to the aircraft's one or more propulsion engine/s and possibly, if present, to an auxiliary power unit such as, e.g., a turboshaft engine and/or a fuel cell etc. Different positions are known for the fuel tanks, depending on a respective type and design of the aircraft.

Conventionally, the respective fuel may be an aviation gasoline or a jet fuel, for instance. In order to achieve a considerable emission reduction, alternative propulsion systems for aircraft have been researched for. In this respect, hydrogen/electric aircraft engines, any propulsion engine which includes piston engines, turbine engines of any architecture, and fuel cell powered electrical propulsion motors have emerged as a promising possibility, for instance. In particular, turbo fans and fuel cells/electric engines respectively powered by hydrogen are being developed as aircraft engines.

However, such hydrogen tanks have a large size relative to the fuselage, due to which they are difficult to access, within the shell, for installation purposes and for maintenance purposes.

SUMMARY OF THE INVENTION

It is an object of the present invention to simplify an installation of an aircraft component of large dimension relative to a fuselage within a shell thereof.

The object may be achieved with a fuselage portion according to one or more embodiments described herein, with an aircraft according to one or more embodiments described herein, and by a method according to one or more embodiments described herein.

A fuselage portion according to the present invention at least forms part of a fuselage of an aircraft; in particular, the fuselage portion may be an entire fuselage. The fuselage portion has a shell (being at least a portion of a shell of the fuselage) and comprises at least one aircraft component (such as a fuel tank, in particular a hydrogen tank) which is installed in the shell by means of a plurality of connector elements.

In what follows, for conciseness reasons and also to improve the unambiguousness of back-references, the at least one aircraft component is referred to only as "a" or "the" aircraft component. Nonetheless, it is to be understood that the fuselage portion may comprise various aircraft components each being installed in the shell in the manner further detailed herein. In such case, the various aircraft components may be of a common type and/or functionality, or of different types and/or functionalities.

Each of the connector elements of a fuselage portion according to the present invention has a first end and, opposite thereto, a second end. In particular, one or various of the connector element/s may preferably be longitudinal, wherein the first end and the second end respectively terminate the length of the respective connector element. In particular, such longitudinal connector element may have a rod-like shape or a pedestal-like shape.

The first end of the respective connector element is held in an associated bore running through the shell. The second end is joined to the aircraft component by a joint which provides the respective connector element with a margin of swiveling relative to the aircraft component.

Said joint thus allows a delimited swiveling of the respective connector element relative to the aircraft component, namely, up to a predetermined tolerance swivel angle which may be, for example at least +/−5° or at least +/−10°, and/or which may be at most +/−20° or at most +/−15°, respectively considered from a center position. The swiveling can be based on a cylindrical motion/bearing or a spherical motion/bearing.

An aircraft according to the present invention comprises a fuselage portion according to an embodiment of the present invention.

A method according to the present invention serves for assembling a fuselage portion according to an embodiment of the present invention. It comprises mounting, from an exterior of the shell, the respective first end of each of the plurality of connector elements in its respectively associated bore. Therein, the respective second end of each connector elements is joined to the aircraft component, thereby forming the respective joint providing the respective connector element with said the margin of swiveling relative to the aircraft component, i.e., allowing a delimited swiveling of the respective connector element relative to the aircraft component. The method may further comprise positioning the aircraft component inside the shell by means of a jig before mounting the connector elements.

Due to the bores running through the shell, the connector elements held therein with their respective first ends are accessible, through the respective bore, from an environment/outside of the shell. The present invention thus advantageously allows avoidance of an internal access, e.g. an access in an interspace between the shell and the aircraft component. Accordingly, the installation of the aircraft component is simplified. Moreover, due to the margin of swiveling provided by the respective joints, an advantageous tolerance compensation is facilitated during an installation of the aircraft component or later on in a maintenance procedure.

In particular, the method according to the present invention may comprise such utilizing of the respective margin of swiveling of at least one of the connector elements for a tolerance compensation in an installation or a realigning (maintenance) procedure of the aircraft component in the shell.

For at least one of the connector elements, the associated bore may run through a local reinforcement of a skin of the shell. Additionally or alternatively, for at least one of the connector elements, the associated bore may run through a portion of a fuselage reinforcement structure; for example, such portion may form part of a frame of a stringer at least partially comprised by the fuselage portion.

The joint of the second end of at least one of the connector elements may in particular comprise a cavity arranged in the aircraft component and holding at least a portion of the second end.

According to advantageous embodiments, the plurality of connector elements comprises at least one connector element which is joined to the aircraft component by a spherical joint. Such joint thus allows a delimited swiveling (of the respective connector element) relative to the aircraft component with a plurality (even an indefinite number) of degrees of freedom. This facilitates a particularly wide scope of fine-tuning of a position of the aircraft component relative to the shell by manipulation of the connector element.

Additionally or alternatively, the plurality of connector elements may comprise at least one connector element which is joined to the aircraft component by a cylindrical joint. Such joint thus facilitates a delimited swiveling (of the respective connector element), by a rotation about a cylinder main axis, relative to the aircraft component with only one degree of freedom. Thereby, a control of a position of the aircraft component relative to the shell may be eased, as undesired movements may be inhibited. A further degree of freedom may be given by a possibility of translation along the cylinder main axis.

One or various of the connector elements may preferably entirely or at least partially fit through its/their respectively associated bore. In particular, the joint of the respective second end of such connector element/s may preferably be solvable by access from a periphery of the shell, or the connector elements may even selectively be removable from and insertable into the interior of the shell (in particular, be replaced) through the associated bore. A method according to the present invention may accordingly comprise inserting from a periphery of the shell at least one of the connector elements through its associated bore.

The connector elements preferably are threaded at least in a portion thereof. In particular, the plurality of connector elements may comprise at least one connector element whose first end is held in the associated bore by means of a screw connection, i.e., by the first end being screwed in a thread provided in the bore.

Additionally or alternatively, the plurality of connector elements may comprise at least one connector element whose first end is pivotably (or even rotationally) combined with the shell in a hemispherical, a spherical, a semi-cylindrical, or a cylindrical bearing. In such embodiment, the respective connector element thus is pivotable both relative to the aircraft component and relative to the shell. Such embodiments provide a particularly wide range of tolerance compensation for the aircraft component being installed.

The plurality of connector elements may comprise one or various connector element/s whose first end/s is/are countersunk in the shell.

In such embodiments, the fuselage portion may comprise one or various plugs each at least partially closing a respective cavity resulting from a countersunk first end of a connector element. A method according to the present invention may accordingly comprise inserting a respective plug into at least one cavity resulting from a corresponding countersunk first end. The inserting is carried out after mounting the respective first end of each connector elements in the respective associated bore, in particular, when a desired orientation and/or tolerance compensation of the aircraft component within the shell has been completed.

Additionally or alternatively, the fuselage portion may comprise at least one counter nut screwed into the respectively associated bore of the one connector element or of at least one of the various connector elements having a countersunk first end. Such counter nut may serve to fix the installation of the aircraft component in the shell. A method according to the present invention may accordingly comprise screwing one or various counter nut/s each into a respective bore associated to at least one of the one or various connector elements having a countersunk first end. The screwing is carried out after mounting the respective first end of each connector elements in the respective associated bore, in particular, when a desired orientation and/or tolerance compensation of the aircraft component within the shell is completed.

In embodiments comprising at least one such counter nut, this may smoothly close the respective bore when screwed therein, such that the shell has an aerodynamic, smooth outer surface at a mouth of the respective bore.

Alternatively, when screwed in, the at least one counter nut may be counter-sunk in the respective bore. In such case, the fuselage component may comprise, in addition to the at least one counter nut, at least one of said plugs at least partially closing a respective cavity. Analogously, the method according to the present invention may comprise both said screwing one or various counter nut/s each into a respective bore, and said inserting a respective plug into at least one resulting cavity.

According to advantageous embodiments, two or more of the bores (more precisely, the respective center axes thereof) respectively associated to one of the connector elements extend in different directions. Thereby, a particularly advantageous support of the aircraft component in the shell is facilitated by the respective connector elements. In particular, the bores may preferably be distributed around a circumference of the shell.

The plurality of connector elements may comprise at least one connector element whose longitudinal direction is inclined to a center axis of the fuselage portion. Such connector element advantageously serves to support the aircraft component against loads in or against a designated direction of flight of the fuselage/aircraft.

According to advantageous embodiments, at least one of the connector element/s is at least partially hollow; thereby, an advantageous saving of weight of can be achieved.

Additionally or alternatively, the plurality of connector elements may comprise at least one connector element including an energy absorbing central section between its first end and its second end. By such energy absorbing central section, which may be configured to absorb tension and/or compression, a crashworthiness of the fuselage portion or of the entire aircraft may be improved.

In cases where various of the connector elements comprise such energy absorbing central section, the respective energy absorbing central section of at least two of these connector elements may differ from each other in their type, material, and/or extension. Thereby, different potential loads and/or different probabilities of potentially emerging loads at respective positions of the connector elements can be taken in account.

BRIEF DESCRIPTION OF THE DRAWINGS

In what follows, preferred embodiments of the present invention are explained with respect to the accompanying drawings. As is to be understood, the various elements and components are depicted as examples only, may be facultative and/or combined in a manner different than that depicted. Reference signs for related elements are used comprehensively and not necessarily defined again for each figure, and the same holds for evident analogies between the figures.

Shown are schematically in:

FIG. 1a is a fuselage portion according to a first embodiment of the present invention in a cross section;

FIG. 1b is the fuselage of FIG. 1a in a longitudinal section;

FIG. 2 is a first possible configuration of a mounted connector element of a fuselage portion according to an exemplary embodiment of the present invention;

FIG. 6b is a fourth possible configuration of a mounted connector element of a fuselage portion according to another or the same exemplary embodiment of the present invention with the plug of FIG. 6a.

DETAILED DESCRIPTION OF THE PREFERRED EMBODIMENTS

Figures 1A, 1B, 2:
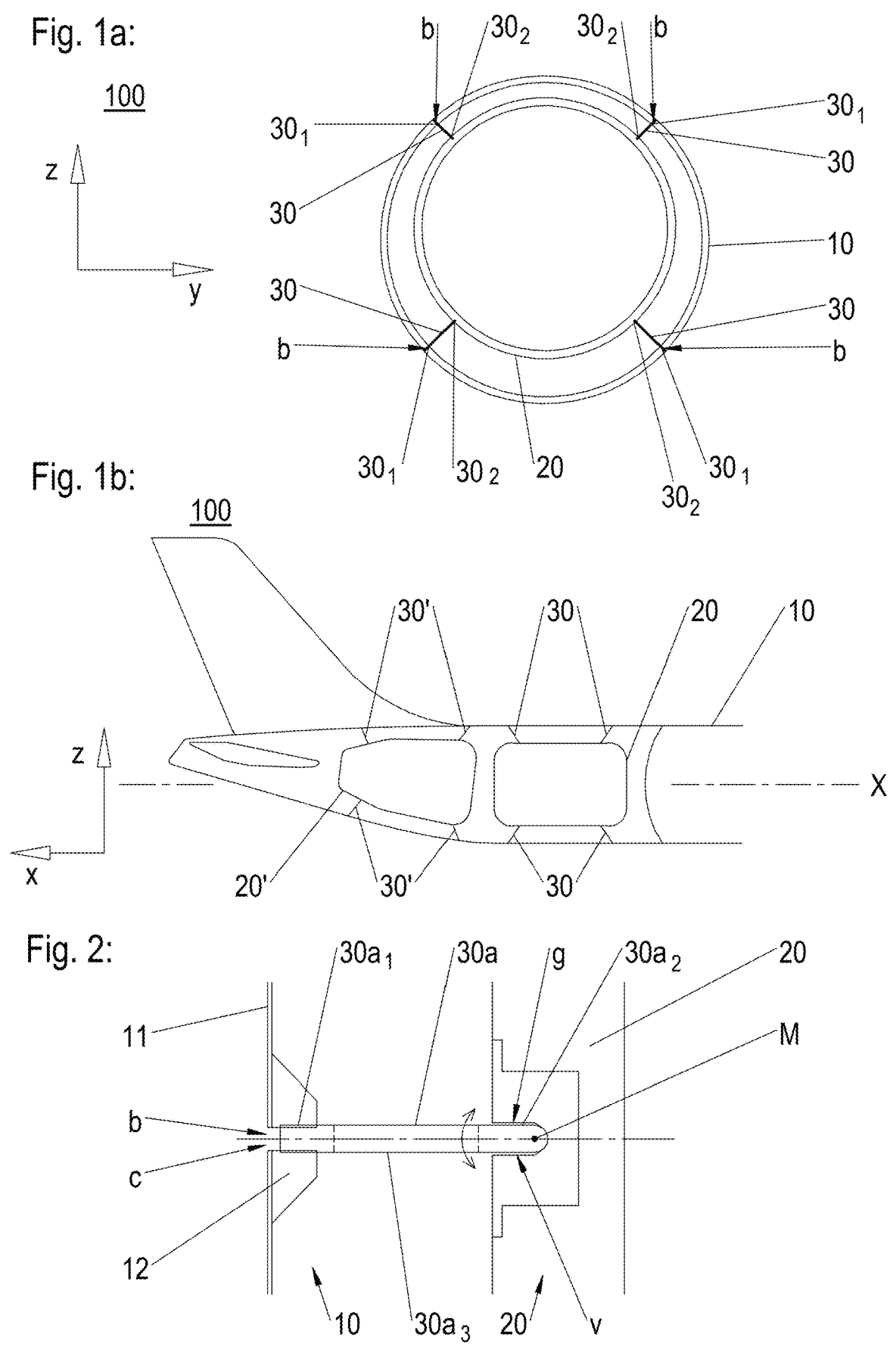
Figure 3:
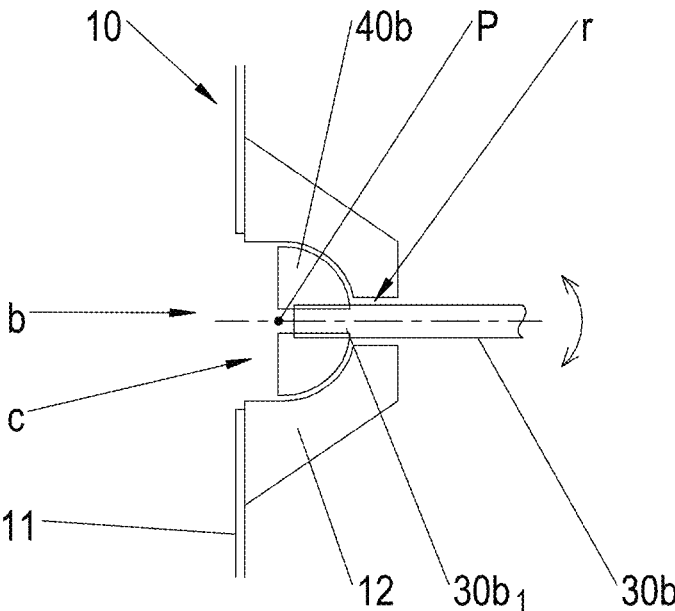
FIG. 3 is a second possible configuration of a mounted connector element of a fuselage portion according to another or the same exemplary embodiment of the present invention.

FIGS. 1a, 1b schematically show a fuselage portion 100 according to an exemplary embodiment of the present invention in a cross section and a longitudinal direction, respectively.

The fuselage portion 100 comprises a shell 10 and two aircraft components 20, 20' (only one of which is visible in FIG. 1a) which in this case are fuel tanks (e.g., hydrogen tanks) arranged in a caudal tandem configuration and which both are installed in the shell by means of a plurality of longitudinal, in the present case rod-shaped connector elements 30, 30'. Therein, a respective first end 301 of each connector element 30, 30' is held in an associated bore b running through the shell. Moreover, although not clearly visible in FIGS. 1a, 1b, a respective second end 302 of each connector element 30, 30' is joined to one of fuel tanks 20, 20' by a joint providing the connector element 30, 30' a margin of swiveling relative to the respective fuel tank 20, 20'; such joining may be as that of the second end $30a_2$ illustrated in FIG. 2 described in more detail below.

In particular, some or all of the connector elements 30, 30' shown in FIGS. 1a, 1b may be configured as are the connector elements 30a, 30b, 30c, 30d partially shown in more detail in FIGS. 2b, 3, 5b, 6, and they may be connected accordingly to the shell 10, as explained below with reference to the respective figures.

As apparent from FIG. 1a, the bores b in the shell are distributed around a circumference of the shell 10. In particular, with respect to the orientation designated for normal flight of the fuselage 100 as shown in FIGS. 1a, 1b, both an upper section and a bottom section of the shell are provided with some of said bores.

As further seen in FIG. 1a, with respect to the coordinate system indicated therein (in which the y-axis is the lateral axis, and the z-axis runs vertically upwards), the connector elements 30 provide support—for the fuel tank 20 within the shell 10—in directions of the y-z-plane.

Additionally, as seen in FIG. 1b, the respective longitudinal extensions of the depicted connector elements 30, 30' of the exemplary fuselage portion 100 are inclined to a center axis X of the fuselage portion, thus to the coordinate system's x-axis running parallel to said center axis X towards a rear of the fuselage portion 100. Thereby, the connector elements 30, 30' also support the fuel tanks 20, 20' within the shell 10 in directions of the x-z-plane.

In such embodiment (though not visible in FIG. 1a, 1b), the use of spherical bearings at both ends of the respective connector elements 30, 30' is favorable.

Some or all of the connector elements 30, 30' shown in FIGS. 1a, 1b may comprise a respective energy absorbing central section (not shown) arranged between the first end 301 and the second end 302 of the respective connector element 30, 30'. Such energy absorbing central section may be configured to absorb tension loads and/or compression loads.

In particular, if various of the connector elements 30, 30' comprise such energy absorbing central section, the respective energy absorbing central section of at least two of these connector elements 30, 30' may differ from each other in their type, material, and/or extension. Thereby, different potential loads and/or different probabilities of potentially emerging loads at respective positions of the connector elements can be taken in account.

FIG. 2 illustrates a possible setting up of an exemplary connector element 30a serving to install the aircraft component 20 (being a fuel tank) in the shell 10. As mentioned above, one or various of the connector elements 30, 30' shown in FIGS. 1a, 1b may in particular be configured as is the connector element 30a shown in FIG. 2, and it/they may be installed accordingly.

As apparent from FIG. 2, the shell 10 comprises a skin 11 and a reinforcement 12, and the bore b runs through both skin 11 and the reinforcement 12. Therein, the reinforcement 12 may form part of a fuselage reinforcement structure (such as a frame or a stringer), or it may be a local reinforcement configured to stabilize the shell 10 at the edge of the bore b. A diameter of the bore b is larger than a diameter of the connector element 30a at the second end $30a_2$ thereof, such that the situation depicted in FIG. 2 could be achieved by inserting the connector element's 30a portion comprising the second end $30a_2$ through the bore b with its second end $30a_2$ ahead.

Figure 5:
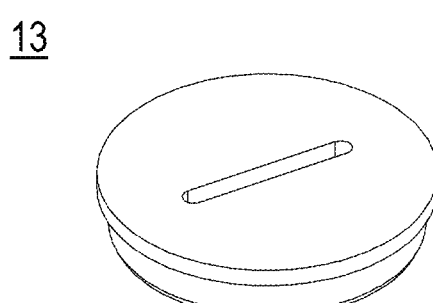
FIG. 5 is a plug possibly comprised by a fuselage portion according to the same or another exemplary embodiment.

A first end $30a_1$ of the connector element 30a is held—in the present case by means of engaging threads of the reinforcement 12 and the connector element 30a—in the bore b. Therein, the first end $30a_1$ is countersunk in the bore b. To provide an aerodynamical, smooth outer surface of the fuselage, the resulting clearance c may be closed by a plug as shown in FIG. 5.

The connector element's second end $30a_2$, whose tip is spherically domed, has been inserted into a cavity v formed in the aircraft component 20 (in the present case, in an optional reinforcement structure thereof), wherein an annular gap g is formed between the connector element 30a and the aircraft component. Thereby, a spherical joint is created which provides the connector element 30a a margin of swiveling relative to the aircraft component 20, as indicated by a double arrow, about any (swiveling) axis running through the tip's center point M.

Alternatively, the second end of the connector element and the aircraft component may form a cylindrical joint facilitating such swiveling only about a swiveling axis running orthogonally to an image plane of FIG. 2 through said point M. For example, such cylindrical joint may include a barrel nut (not shown) the aircraft component may comprise, wherein the second end of the connector element may be screwed into the barrel nut and wherein a cylinder axis of the barrel nut runs along said axis running orthogonally to an image plane of FIG. 2 through said point M.

In the embodiment shown in FIG. 2, the connector element 30a further comprises an energy absorbing central section 30$a_3$ arranged between the first end 30$a_1$ and the second end 30$a_2$ of the connector element 30a. Such energy absorbing central section may be configured to absorb tension loads and/or compression loads.

FIG. 3 illustrates another exemplary embodiment of the present invention; therein, only a portion of a connector element 30b comprising a first end 30$b_1$ held in an associated bore b in a shell 10 (in particular in a skin 11 and a reinforcement 12 thereof) is depicted.

At its not shown second end, the connector element 30b may be connected to an aircraft component in accordance with what is described above. Moreover, between its first end 30$b_1$ and its second end, the connector element 30b may (or may not) comprise an energy absorbing central section (also not shown) as described above.

As indicated by a double-arrow, the first end 30$b_1$ of the connector element 30b shown in FIG. 3 is pivotably combined with the shell 10 in a bearing provided by a bearing element 40b with an associated socket and allowing the connector element 30b to pivot relative to the shell 10 (wherein the pivoting is delimited by the reinforcement 12). Therein, an annular gap r between the reinforcement 12 and the connector element 30b, which gap r results from a diameter of the bore b being larger than a diameter of the connector element 30b, ensures the functionality of the bearing.

Owing to the bearing, tolerances of an aircraft component's installation (not shown in FIG. 3) within the shell 10 can be compensated also at the first end 30$b_1$ of the connector element 30b.

Therein, as not definitive from FIG. 3 due to the cross section, the bearing element 40b may be hemispherical or semi-cylindrical, in both cases being in accordance with respective embodiments of the present invention.

Indeed, the bearing element 40b may have a hemispherical shape or may be shaped as a longitudinal half of a cylinder whose cylinder axis extends, orthogonally to an image plane of FIG. 3, through a center point P. In the former case (of a hemispherical bearing element), the bearing permits a (delimited) pivoting about said point P in any direction, i.e., a (delimited) rotational movement of the connector element 30b about said point P. In case, however, the bearing element 40b is shaped as a half cylinder, it facilitates only a pivoting of the connector element 30b relative to the shell 10 about a pivot axis which is orthogonal to an image plane of FIG. 3 and runs through said center point P.

By permitting such pivoting (or even rotational movement), the bearing facilitates a particularly wide range of tolerance compensation for the aircraft component being installed.

The bearing element 40b is connected to the connector element 30b by means of engaging threads. As a consequence, and further to the tolerance compensation due to said pivoting mentioned above, tolerances of an installation of the aircraft component 20 within the shell can be linearly adjusted.

As apparent from FIG. 3, the bearing element 40b is countersunk in a socket which is formed, as a widening of the bore b, in the shell 10, in particular in the reinforcement 12 thereof, and whose shape is advantageously adapted to the shape of the bearing element 40b. In particular, depending on the shape of the bearing element 40b, the socket may include a hemispherical portion or a portion extending along a cylinder.

To provide an aerodynamic, smooth outer surface of the fuselage, the clearance c resulting from the countersink may be closed by a plug which may be configured as plug 13 shown in FIG. 5.

As mentioned above, one or various of the connector elements 30, 30' shown in FIGS. 1a, 1b may in particular be configured as is the connector element 30b partially shown in FIG. 3, and may be held accordingly in their respectively associated bores through the shell 10.

Figure 4:
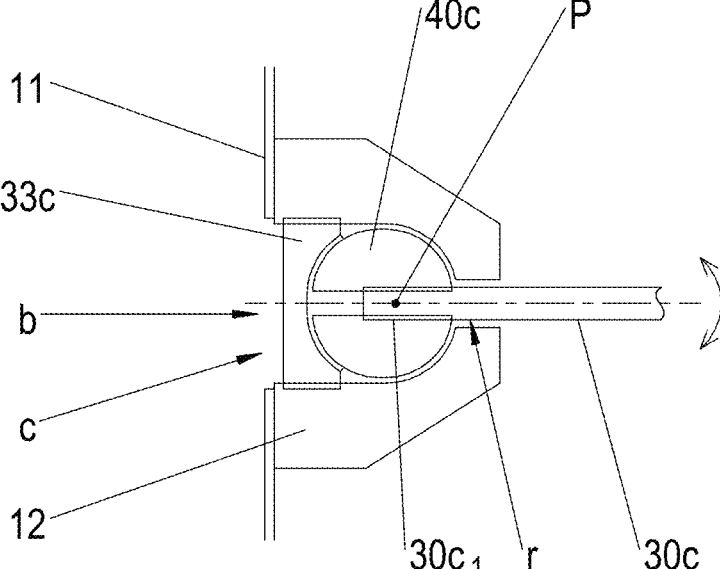
FIG. 4 is a third possible configuration of a mounted connector element of a fuselage portion according to another or the same exemplary embodiment of the present invention.

In FIG. 4, a further exemplary embodiment of the present invention is illustrated. Analogous to the case of FIG. 3, only a portion of a connector element 30c comprising a first end 30$c_1$ held in an associated bore b in a shell 10 (in particular in a skin 11 and a reinforcement 12 thereof) is depicted.

At its not shown second end, the connector element 30c may be connected to an aircraft component in accordance with what is described above. Additionally or alternatively, between its first end 30$c_1$ and its second end, the connector element 30c may (or may not) comprise an energy absorbing central section (likewise not shown) as described above.

Also in the case of the embodiment shown in FIG. 4, the first end 30$c_1$ of the connector element 30c is pivotably combined with the shell 10 in a bearing provided by a bearing element 40c with an associated socket and allowing the connector element 30c in particular to pivot about a pivot axis running, orthogonally to an image plane of FIG. 4, through a center point P. Owing to a diameter of the bore b being larger than a diameter of the connector element 30c, an annular gap r is formed between the reinforcement 12 and the connector element 30c, whereby the functionality of the bearing is ensured. Therein, however, the pivoting is delimited by the reinforcement 12.

Therein, as not definitive from FIG. 4 due to the cross section, the bearing may be spherical or cylindrical, both cases being in accordance with respective embodiments of the present invention.

Indeed, the bearing element 40c may have a spherical shape or a cylindrical shape having a cylinder axis extending orthogonally to an image plane of FIG. 4 through a center point P.

In the former case (of a spherical bearing element 40c), the bearing even permits a (delimited) pivoting about said point P in any direction, i.e., a (delimited) rotational movement of the connector element 30c about said point P. In case, however, the bearing element 40c is shaped as a cylinder, it facilitates only a pivoting of the connector element 30c relative to the shell 10 about a pivot axis which is orthogonal to an image plane of FIG. 4 and runs through said center point P.

By permitting such pivoting (or even rotational movement), the bearing element 40b facilitates a particularly wide range of tolerance compensation for the aircraft component being installed.

In the exemplary embodiment shown in FIG. 4, the bearing element 40c is connected to the connector element 30c by means of engaging threads which analogous to the above-mentioned embodiments (and further to the tolerance compensation due to said pivoting mentioned above) facilitates linearly adjusting tolerances of an installation of an aircraft component (not shown in FIG. 4) within the shell 10.

As apparent from FIG. 4, the bearing element 40c is countersunk in a socket which is formed, as a widening of the bore b, in the shell 10, in particular the reinforcement 12 thereof, and whose shape is advantageously adapted to the shape of the bearing element 40c. In particular, depending on the shape of the bearing element 40c (as mentioned above), the socket may include a hemispherical portion or a portion extending along a cylinder.

The embodiment partially shown in FIG. 4 further comprises a counter nut 33c fastened to the reinforcement 12 by form-fitting and/or force-fitting means which in the present case comprise engaging threads. The counter nut 33c in this embodiment serves to fix the connection element 30c.

In the case depicted in FIG. 4, the counter nut is countersunk in the bore b arranged in the shell 10. To provide an aerodynamic, smooth outer surface of the fuselage, the resulting clearance c may be closed by a plug such as the plug 13 depicted in FIG. 5. According to alternative embodiments (not shown), the counter nut may be configured to fix the connection element 30c without being countersunk, i.e., to itself smoothly continue an outer surface of the skin 11 when being fastened to the reinforcement 12.

Again, as mentioned above, one or various of the connector elements 30, 30' shown in FIGS. 1a, 1b may in particular be configured as is the connector element 30c partially shown in FIG. 4, and may be held accordingly in their respectively associated bores through the shell 10.

As mentioned above, FIG. 5 shows a plug 13 possibly comprised by a fuselage portion according to the present invention. The plug 13 may be screwed into the shell's bore in which the connector element is held. Therein, an aerodynamic, smooth outer surface can be established by screwing in/out the plug to a most suitable position thereof.

Figure 6A:
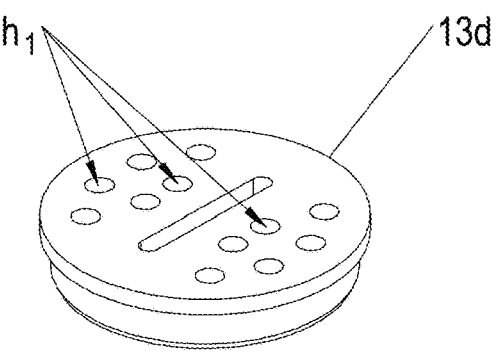
FIG. 6a is an alternative plug.
Figure 6B:
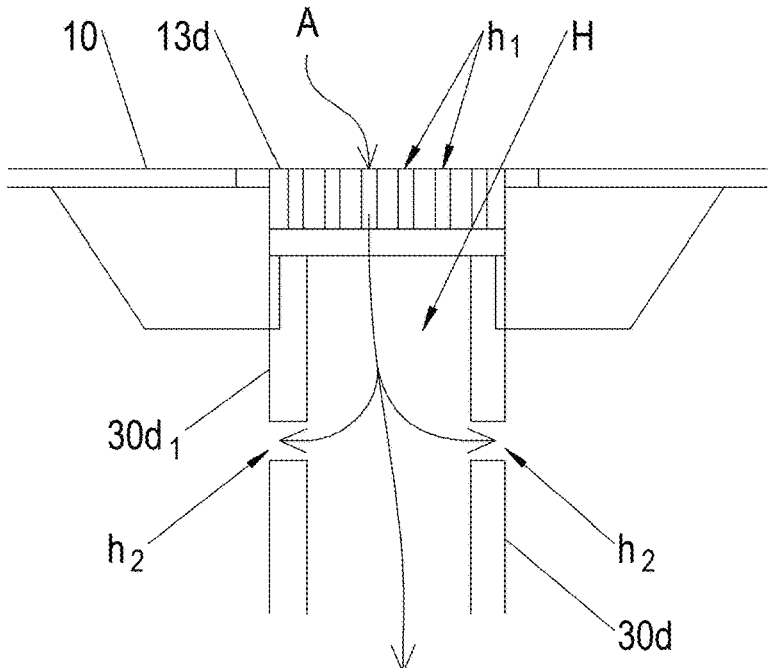
Figure 6C:
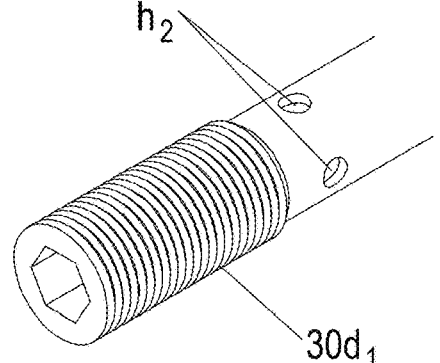
FIG. 6c is a section of the connector element of FIG. 6b in perspective view.

FIGS. 6a-6c illustrate an exemplary embodiment of the present invention having a ventilation function. Therein, FIG. 6b provides a longitudinal section of a portion of a connection element 30d with a first end $30d_1$ being held, analogously to the case depicted in FIG. 2, in a bore of a shell 10 of a fuselage. Therein, the first end $30d_1$ is countersunk in the shell 10. The resulting clearance in this case is closed by a plug 13d.

FIGS. 6a and 6c provide perspective views of the plug 13d and of the portion of the connection element 30d, respectively.

As apparent from these figures, the plug 13d is perforated with a plurality of holes $h_1$, and the connector element 30d is hollow and has a plurality of holes $h_2$ connecting a center hollow H within the connector element 30d with a circumference thereof. As a consequence, and as indicated in FIG. 6b, an air flow A between the circumference of the shell 10 and the interior of the shell 10 is facilitated through the holes $h_1$, the center hollow H and the holes $h_2$. Accordingly, the interior of the shell can be ventilated, which is in particular advantageous when the aircraft component is a hydrogen tank installed in an aft portion of the fuselage.

As is to be understood, a ventilation may analogously be provided through connector elements having first ends which are pivotally combined with the shell, as exemplarily illustrated in FIGS. 3, 4.

Disclosed is a fuselage portion 100 of or for an aircraft. The fuselage portion comprises an aircraft component 20, 20' which is installed in a shell 10 of the fuselage portion by means of a plurality of connector elements 30, 30', 30a, 30b, 30c, 30d. Therein, a respective first end $30_1$, $30a_1$, $30b_1$, $30c_1$, $30d_1$ of each connector element is held in an associated bore b running through the shell 10 (possibly through a reinforcement 12 thereof), and a respective second end $30_2$, $30a_2$ of each connector element is joined to the aircraft component 20, 20' by a joint providing the respective connector element 30, 30', 30a, 30b, 30c, 30d a margin of swiveling relative to the aircraft component 20, 20'.

Further disclosed are an aircraft comprising such fuselage portion 100, and a method for assembling such fuselage portion 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 10 shell
11 skin
12 local reinforcement or portion of fuselage reinforcement structure
13, 13d plug
20, 20' aircraft component
30, 30' connector element
$30_1$ first end of connector element 30
$30_2$ second end of connector element 30
30a connector element
$30a_1$ first end of connector element 30a
$30a_2$ second end of connector element 30a
$30a_3$ energy absorbing central section of connector element 30a
30b connector element
$30b_1$ first end of connector element 30b
$30b_2$ second end of connector element 30b
30c connector element
$30c_1$ first end of connector element 30c
$30c_2$ second end of connector element 30c
33c counter nut
40b bearing element of the connector element 30b
40c bearing element of the connector element 30c
b bore
c clearance
g annular gap
$h_1$ hole in plug 13d
$h_2$ hole in connector element 30d
r annular gap
v cavity
A air flow
H center hollow in connector element 30d
L longitudinal axis
M center point
P center point

The invention claimed is:
1. A fuselage portion of or for an aircraft, the fuselage portion comprising:

an aircraft component installed in a shell of the fuselage portion by a plurality of connector elements, wherein a respective first end of each connector element is held in an associated bore running through the shell; and a respective second end of each connector element is joined to the aircraft component by a joint providing the respective connector element a margin of swiveling relative to the aircraft component, wherein for at least one of the connector elements of the plurality of connector elements, said joint is a spherical joint.

2. The fuselage portion according to claim 1, wherein for at least one of the connector elements of the plurality of connector elements, said joint is a cylindrical joint.

3. The fuselage portion according to claim 1, wherein for at least one of the connector elements of the plurality of connector elements, an associated bore runs through a local reinforcement of a skin of the shell, or wherein for at least one of the connector elements of the plurality of connector elements, an associated bore runs through a portion of a fuselage portion reinforcement structure, or both.

4. The fuselage portion according to claim 1, wherein said first end of at least one of the connector elements of the plurality of connector elements is pivotably connected to the shell in a hemispherical, a spherical, a semi-cylindrical, or a cylindrical bearing.

5. The fuselage portion according to claim 1, wherein the plurality of connector elements comprises one or more counter-sunk connector elements having respective first ends counter-sunk in the shell.

6. The fuselage portion according to claim 5, wherein for at least one of the one or more counter-sunk connector elements, a resulting cavity in the shell is shut by an associated plug.

7. The fuselage portion according to claim 5, wherein for at least one of the one or more counter-sunk connector elements, a dedicated counter nut is screwed in the associated bore.

8. The fuselage portion according to claim 1, wherein the bores associated with the plurality of connector elements are distributed around a circumference of the shell.

9. The fuselage portion according to claim 1, wherein a longitudinal extension of at least one of the connector elements of the plurality of connector elements is inclined to a center axis of the fuselage portion.

10. The fuselage portion according to claim 1, wherein at least one of the connector elements of the plurality of connector elements comprises, between the first end and the second end, an energy absorbing central section.

11. The fuselage portion according to claim 1, wherein the aircraft component is a hydrogen tank of the aircraft.

12. An aircraft comprising:

a fuselage portion according to claim 1.

13. A method for assembling a fuselage portion, the fuselage portion comprising: an aircraft component installed in a shell of the fuselage portion by a plurality of connector elements, wherein a respective first end of each connector element of the plurality of connector elements is held in an associated bore running through the shell, and wherein a respective second end of each connector element of the plurality of connector elements is joined to the aircraft component by a joint providing the respective connector element a margin of swiveling relative to the aircraft component, the method comprising:

mounting, from an exterior of the shell, the respective first end of each of the plurality of connector elements in the respectively associated bore, wherein the respective second end of each connector element of the plurality of connector elements are joined to the aircraft component, thereby forming the respective joint providing the respective connector element of the plurality of connector elements with said margin of swiveling relative to the aircraft component, wherein for at least one of the connector elements of the plurality of connector elements, said joint is a spherical joint.

14. The method according to claim 13, wherein the aircraft component is installed or realigned, in the shell, utilizing the respective margin of swiveling of at least one of the connector elements of the plurality of connector elements for a tolerance compensation.

15. A fuselage portion of or for an aircraft, the fuselage portion comprising:

an aircraft component installed in a shell of the fuselage portion by a plurality of connector elements, wherein a respective first end of each connector element is held in an associated bore running through the shell; and a respective second end of each connector element is joined to the aircraft component by a joint providing the respective connector element a margin of swiveling relative to the aircraft component, wherein said first end of at least one of the connector elements of the plurality of connector elements is pivotably connected to the shell in a hemispherical, a spherical, a semi-cylindrical, or a cylindrical bearing.

* * * * *